United States Patent [19]

Yamamoto et al.

[11] Patent Number: 5,656,165
[45] Date of Patent: Aug. 12, 1997

[54] DEWATERING APPARATUS OF FILTER BELT TYPE

[75] Inventors: Kaoru Yamamoto; Haruji Iwano, both of Yokohama, Japan

[73] Assignees: Yamamoto Kogyo Kabushiki Kaisha, Tokyo; Kabushiki Kaisha Asakura Kogyosho, Kawasaki, both of Japan

[21] Appl. No.: 493,473

[22] Filed: Jun. 22, 1995

[51] Int. Cl.$^6$ .............................. B01D 33/052; B03B 9/24
[52] U.S. Cl. ........................ 210/400; 210/401; 210/783; 100/118; 100/153
[58] Field of Search .................................. 210/386, 400, 210/401, 783; 100/118, 153

[56] References Cited

U.S. PATENT DOCUMENTS

| 3,799,052 | 3/1974 | Kusters . |
| 3,973,483 | 8/1976 | Appenzeller . |
| 4,935,138 | 6/1990 | Gaudfrin . |

FOREIGN PATENT DOCUMENTS

| A 0155658 | 9/1985 | European Pat. Off. . |
| A 0311526 | 4/1989 | European Pat. Off. . |
| A 1786320 | 1/1972 | Germany . |
| 3715828 | 11/1988 | Germany . |
| 57-79099 | 5/1982 | Japan . |
| A 62-224499 | 2/1987 | Japan . |
| 62-151299 | 7/1987 | Japan . |
| 62-176699 | 8/1987 | Japan . |
| 62-230498 | 10/1987 | Japan . |
| 6-304796 | 4/1993 | Japan . |
| 6-304797 | 4/1993 | Japan . |
| 6-246111 | 9/1994 | Japan . |
| 2010690 | 7/1979 | United Kingdom . |
| A 2051598 | 1/1981 | United Kingdom . |

*Primary Examiner*—Thomas M. Lithgow
*Attorney, Agent, or Firm*—Armstrong, Westerman, Hattori, McLeland & Naughton

[57] ABSTRACT

A dewatering apparatus of filter belt type has a guide member having a guide surface whose radius of curvature becomes smaller in the direction of belt travel. An endless roller chain travels along the guide member. A restricting sprocket has a pair of engaging tooth surfaces for engaging with rollers of said roller chain and is rotatably supported near one end portion of the guide member. Endless filter belts hold sludge between an upper filter belt and a lower filter belt. The filter belts are arranged to partly overlap on the rollers from a side of the guide surface of a larger radius of curvature and to depart from the rollers at a side of the guide surface of a smaller radius of curvature, whereby the upper filter belt and the lower filter belt are separated from each other to discharge the sludge. Driving rollers give a traction to the filter belts at a side at which the filter belts are separated from the roller chain.

3 Claims, 2 Drawing Sheets

DEWATERING APPARATUS OF FILTER BELT TYPE

BACKGROUND OF THE INVENTION

1. Field of the Invention

The present invention relates to a dewatering apparatus of filter belt type, i.e., an apparatus in which sludge to be fed into a space between double filter belts is dewatered by pressing by means of rollers.

2. Description of Related Art

As this kind of art, there has hitherto been known an apparatus as disclosed, e.g., in Japanese Published Examined Patent Application No. 20360/1990. In this apparatus, a plurality of planetary rollers which are arranged to rotate around a sun roller while rotating on their own axes are held by carriers. Filter belts are wound around an outer side of the planetary rollers and are tracted.

In the apparatus of this conventional art, since the direction of movement of the planetary rollers is restricted by the carriers, there are required carriers that securely hold the planetary rollers. In addition, since the filter belts are always in contact with the planetary rollers in the same conditions, a high rate of dewatering cannot be obtained.

SUMMARY OF THE INVENTION

The present invention has an object of providing a dewatering apparatus which is simple in construction and has a high rate of dewatering.

In order to attain the above and other objects, the present invention is a dewatering apparatus of filter belt type comprising a guide member having a guide surface whose radius of curvature varies between a large one and a small one, an endless roller chain which travels along the guide member, restricting sprocket means which has engaging tooth surfaces for engaging with rollers of the roller chain and is rotatably supported near one end portion of the guide member, endless filter belt means adapted to hold sludge between an upper filter belt and a lower filter belt. The filter belt means is arranged to partly overlap on the rollers from a side of the guide surface of a larger radius of curvature and to depart from the rollers at a side of the guide surface of a smaller radius of curvature, whereby the upper filter belt and the lower filter belt are separated from each other to discharge the sludge. Driving roller means gives a traction to the filter belt means preferably on a side at which the filter belt means is separated from the roller chain.

The sprocket means may comprise a pair of sprockets which are disposed near both ends of the rollers or a sprocket which is disposed substantially in an axially central portion of the rollers and has a width enough to guide the roller chain.

The guide member may be polygonal in cross section having alternately arranged sections of larger radius of curvature and smaller radius of curvature.

When the filter belts are tracted by overlapping on the roller chain, there occurs a pressure in the direction of overlapping, giving rise to the function of dewatering. If the radius of curvature of the guide surface becomes smaller in the direction of travel of the filter belts, the pressure increases to thereby increase the rate of dewatering. Further, since each of the rollers is brought into engagement with the restricting sprocket, the axial direction is automatically corrected during the movement of the roller chain, even if the rollers get inclined. As a result, the rollers can roll on a correct locus.

BRIEF DESCRIPTION OF THE DRAWINGS

The above and other objects and the attendant advantages will become readily apparent by reference to the following detailed description when considered in conjunction with the accompanying drawings wherein.

DETAILED DESCRIPTION OF A PREFERRED EMBODIMENT

A preferred embodiment of the present invention will now be explained with reference to the accompanying drawings.

Figure 1:
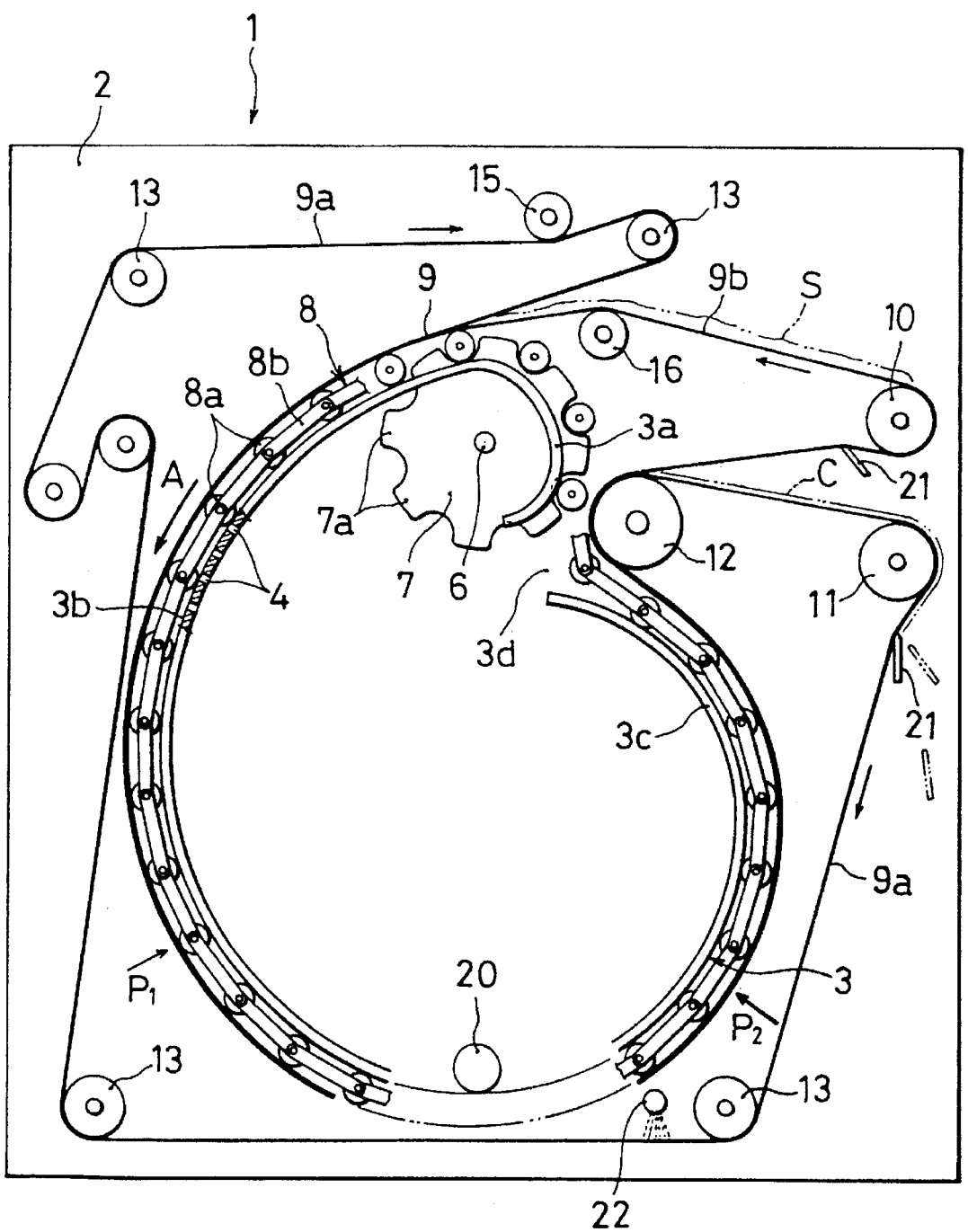
FIG. 1 is a vertical sectional view of an embodiment of the present invention.

Referring to FIG. 1, numeral 1 denotes a dewatering apparatus, numeral 2 denotes side walls defining an outer periphery or frame of the dewatering apparatus 1 and numeral 3 denotes a guide member which is fixed to each side of the side walls 2. This guide member 3 has a shape like a comma-shaped bead or a slightly deformed C-shape and is made up of an introducing portion 3a of a semicircular section, a guide surface portion and a discontinuous portion 3d. The guide surface portion is made up of an arcuate section 3b whose radius of curvature is large (i.e., its curvature is small) and an arcuate section 3c whose radius of curvature is small (i.e., its curvature is large). This guide member 3 is provided on its entire surface with a large number of drain holes 4.

Figure 2:
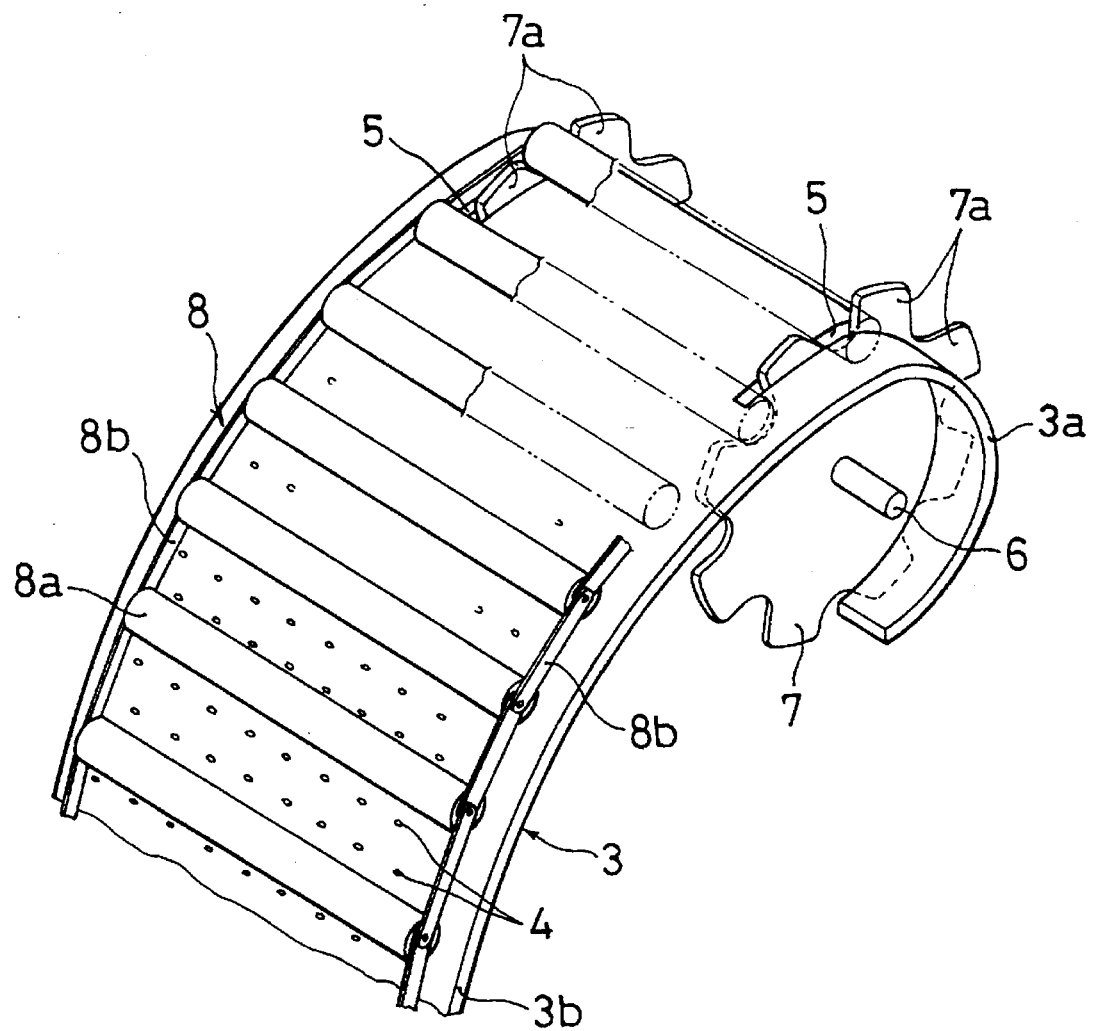
FIG. 2 is a partial perspective view thereof.

In the introducing portion 3a, there are provided, as shown in FIG. 2, a pair of narrow grooves 5 at a distance from each other. Teeth 7a of a pair of restricting sprockets 7 which are fixed to a shaft 6 of the sprocket at the same phase are arranged to project beyond the narrow grooves 5. The shaft 6 of the sprocket 7 is rotatably supported on both side walls 2.

The roller chain 8 is made into an endless chain having a large number of rollers 8a which are disposed in parallel with each other and are connected by links 8b so as to be rotatable and slightly movable in an axial direction of the roller 8a. The roller chain 8 is fitted into an outer periphery of the guide member 3 such that each roller 8a is moved while rotating on each of the arcuate sections 3b and 3c and is moved forwards by skipping the discontinuous portion 3d.

The filter belts 9 are made up of an upper (or an outer as seen in connection with rotation) filter belt or cloth 9a and a lower (or inner as seen in connection with rotation) filter belt or cloth 9b. The sludge S which is fed onto the lower filter belt 9b is pinched under pressure between the lower filter belt 9b and the upper filter belt 9a. The dewatering operation is performed while the filter belts 9a, 9b make substantially one rotation around the guide member 3 on the roller chain 8 in the direction shown by an arrow A. The upper filter belt 9a and the lower filter belt 9b are respectively tracted by driving rollers 10, 11. After dewatering in a combined operation of both filter belts 9, 9b, they are separated from each other after passing through a guide roller 12, thereby discharging the cake C, and are circulated by being guided by guide rollers 13 and guide (or restriction) rollers 15, 16. In case a large driving force is required, the guide roller 12 may also be constituted as a driving roller.

The filter belts 9 to be tracted by the driving rollers 10, 11 move, after positioning by the guide (or restriction) rollers 15, 16, through a rolling operation or function of the rollers 8a from the arcuate section 3b of large radius of curvature towards the arcuate section 3c of smaller radius of curvature. A perpendicular force to be urged against the rollers 8a by the traction works or operates as a squeezing force, thereby squeezing the water content in the sludge S. The squeezed water partially flows either directly through the outer surfaces of the filter belts or along the rollers and is discharged partially through the discharge holes 4 and finally through a discharge outlet 20.

Let the perpendicular pressure at the arcuate section 3b of a large radius of curvature be $P_1$ and the perpendicular pressure at the arcuate section 3c of a small radius of curvature be $P_2$. Then, the smaller is the radius of curvature, the larger becomes the pressure. It follows that $P_1 < P_2$, with the result that the squeezing force at the section of smaller radius of curvature becomes larger, and the rate of dewatering becomes large. The radius of curvature of the guide member 3 may be changed to further multiple stages, instead of the above-described two stages in the form of the above-described arcuate sections 3b and 3c.

The filter belts 9 are separated into the upper filter belt 9b and the lower filter belt 9a after passing through the guide loller 12. The residue or dewatered cake C is either freely dropped or scraped by a knife or a scraper 21. Sludge which remains adhered on the filter belts is washed with a spray 22. The filter belts 9a, 9b are guided or restricted by the guide (or restriction) rollers 15, 16 into a correct position and continue the squeezing operation by receiving the feeding of the new sludge S.

On the other hand, the rolling force to be added from the filter belts 9 to the rollers 8a facilitates the movement of the filter belts 9 due to the roller function or rolling function. The roller chain 8 travels on the guide member 3 at one-half the speed of the filter belts 9 and, at the discontinuous portion 3d, reaches the introducing portion 3a by skipping it. Since there are provided a pair of sprockets 7 in the introducing portion 3a, each of the rollers 8a is engaged with teeth 7a of the right and the left sprockets 7. If one of the rollers 8a is inclined, it may be engaged with one of the teeth 7a but will remain out of contact with the other of the teeth 7a.

However, as the engagement advances and the roller 8a moves towards the bottom of the teeth, the roller 8a on the side of non-contact also moves down to the bottom of the teeth. Since both sprockets 7, 7 are in the same phase, the roller 8a in question becomes parallel with the shaft 6 of the sprockets 7, 7, thereby assuming a right position. As a result, the roller chain 8 can move on the guide member 3 in the correct locus.

In the above-described embodiment, the guide member 3 is substantially in the shape of the comma-shaped bead in cross section. It may of course be possible to make it to a substantial polygon which is made up of alternately arranged sections of larger radius of curvature and smaller radius of curvature so as to vary the squeezing force to be operated on the filter belts. In any case, however, it is necessary to provide a restricting sprocket 7 on an inner side or an outer side of the guide member 3 to thereby correct the posture of the roller chain 8. In addition, in case there is an excess or a shortage in the length of the roller chain 8 relative to the peripheral length of the guide member S, the excess or shortage of the roller chain 8 can be adjusted by the positioning of the restricting sprocket 7.

If there is used, as the restricting sprocket 7, a sprocket which has teeth whose width is large enough to correctly guide the roller chain 8, there can also be obtained a restricting function by the width of the teeth. Therefore, there may be provided only one sprocket in substantially the axially central portion of the roller 8a.

As has been described hereinabove, according to the present invention, since a roller chain is used as a supporting body for supporting the travelling filter belts, the construction of the supporting member can be made simple, and the length of the guide member along which the roller chain travels can be made long. Further, there can be provided a section having a smaller radius of curvature. Therefore, the squeezing can be performed for a longer period of time and a higher pressure can be applied in the sections having a smaller radius of curvature. As a consequence, a higher rate of dewatering can be obtained. In addition, there is another advantage in that the excess or shortage of the roller chain can be adjusted by the restricting sprocket. Still furthermore, since the travelling direction of the roller chain is always restricted by the restricting sprocket, there will occur no askew travelling of the roller chain and, consequently, a smooth operation can be continued.

It is readily apparent that the above-described dewatering apparatus of filter belt type meets all of the objects mentioned above and has the advantage of wide commercial utility. It should be understood that the specific form of the invention hereinabove described is intended to be representative only, as certain modifications within the scope of these teachings will become readily apparent to those skilled in the art.

Accordingly, reference should be made to the following claims in determining the full scope of the invention.

What is claimed is:

1. A dewatering apparatus of filter belt type comprising:

a guide member having an end portion and a guide surface with a radius of curvature which varies between a large one and a small one;

an endless roller chain having rollers, said endless roller chain travelling along said guide member;

restricting sprocket means which has engaging tooth surfaces for engaging with said rollers of said roller chain and is rotatably supported near said end portion of said guide member;

endless filter belt means, having an upper filter belt and a lower belt, for holding sludge between said upper filter belt and said lower filter belt and for dewatering said sludge, said filter belt means being arranged to partly overlap on said rollers from a side of said guide surface of a larger radius of curvature and to depart from said rollers at a side of said guide surface of a smaller radius of curvature, whereby said upper filter belt and said lower filter belt are separated from each other to discharge said sludge; and driving roller means to give a traction to said filter belt means.

2. A dewatering apparatus of filter belt type according to claim 1, wherein said driving roller means is disposed at a location where said filter belt means is separated from said roller chain.

3. A dewatering apparatus of filter belt type according to claim 1, wherein each of said rollers has first and second opposing ends and said sprocket means comprises a pair of sprockets with each sprocket being located near a respective opposing end of said rollers.

* * * * *